Patented Feb. 19, 1929.

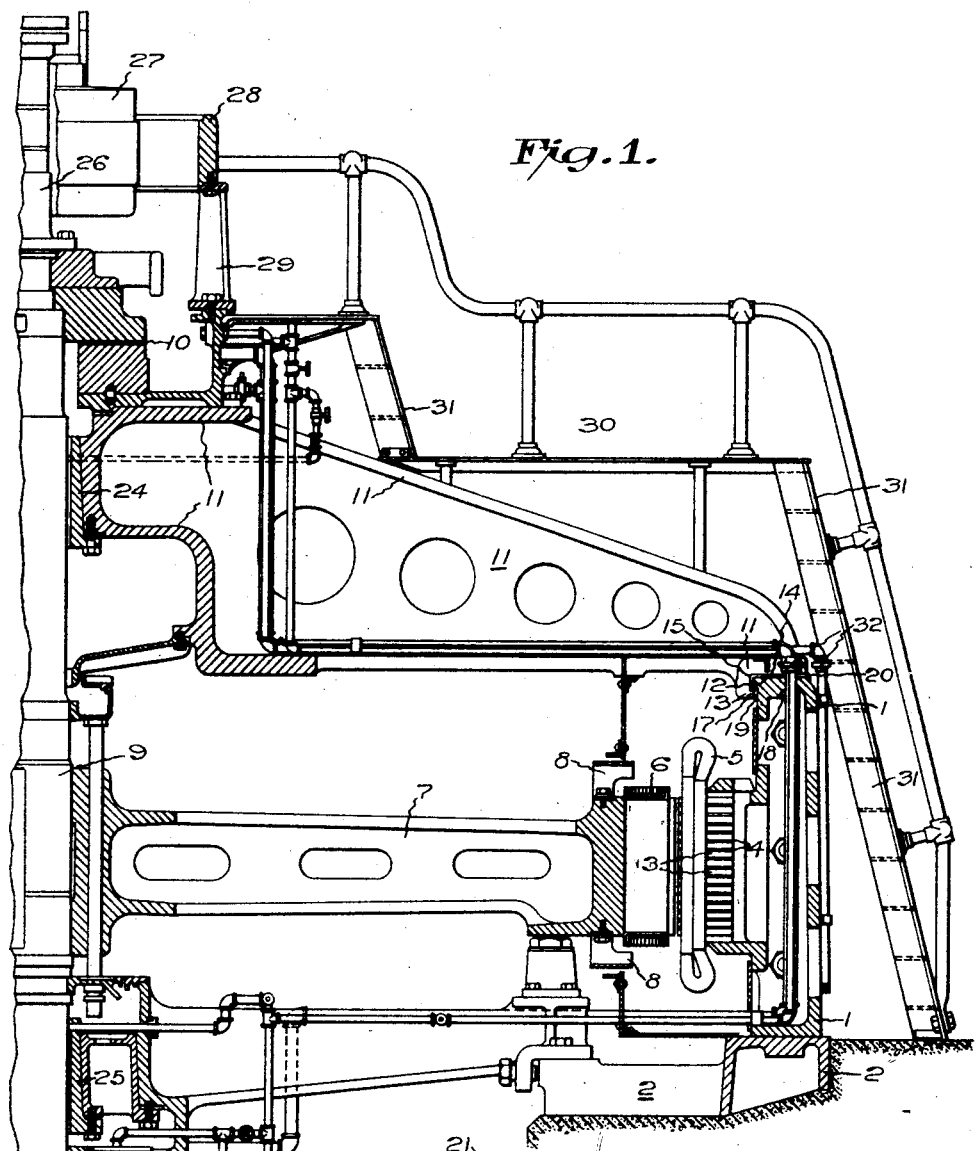

1,702,459

UNITED STATES PATENT OFFICE.

CHARLES C. BRINTON, OF EDGEWOOD, PENNSYLVANIA, ASSIGNOR TO WESTINGHOUSE ELECTRIC & MANUFACTURING COMPANY, A CORPORATION OF PENNSYLVANIA.

BEARING INSULATION FOR VERTICAL GENERATORS.

Application filed September 2, 1926. Serial No. 133,181.

My invention relates to bearing insulation for dynamo-electric machines and it has particular relation to the insulation of the bearing end brackets of large vertical alternators for stopping the flow of shaft currents resulting from the interlinkage of an alternating flux with the circuit comprising the shaft, end bearings and frame.

The presence of shaft currents resulting from divided stator laminations in alternating-current machines is well known, and the damage resulting in the way of pitting or scoring of the bearing has frequently been observed. In order to overcome the disadvantages just mentioned, it has been common to insulate the bearing lining or the bearing bracket or pedestal from the bed plate or stator frame of the machine.

My present invention relates to an improved arrangement whereby the insulation of the bearing brackets may be accomplished in large machines where the size and weight of the parts have been such as to cause very great difficulty due to the lack of an insulating material having sufficient strength and toughness to resist damage during the assembly of the heavy apparatus.

In particular, my invention relates to means providing a telescoping flange for guiding the end bracket and stator frame together during the assembly, the flange being recessed and lined with insulation to insulate the parts when they are in their final position, while the insulation is protected from being torn off since it is flush with the outer or guiding edge of the flange which is recessed at this point. My invention will best be understood by reference to the accompanying drawing, wherein Figure 1 is a sectional elevational view of a turbo-alternator embodying my invention and Fig. 2 is a similar detailed enlarged view showing the insulating joint between the upper end bracket and the stator frame.

As shown in the drawing, my invention is applied to a machine comprising a stator frame 1, which is mounted upon a bed plate 2 and is provided with stator punchings 3 separated by radial ventilating spaces 4 and carrying a stator winding 5. The rotor member comprises salient field pole pieces 6 mounted on a rotor spider 7. The spider is usually provided with fan blades or blowers 8 for ventilating the machine in any well-known manner. The rotor is mounted upon a main shaft 9 which is suspended from a thrust bearing 10 carried by an upper end bracket 11, which rests upon the stator frame 1.

At the junction between the end bracket 11 and the stator frame 1, the end bracket is provided with a flanged seat 12 comprising a depending segmental annular flange 13 and a horizontal seating member 14. As shown more in detail in Fig. 2, the depending flange 13 is recessed in the upper portion of its outer surface as indicated at 15, to receive an insulating lining 16 which is flush with the lower non-recessed portion 17 of the depending flange.

The upper end of the cylindrical stator 1 is provided with an enlarged head 18 which provides a spaced or cut-away portion 19 opposite the lower portion 17 of the depending flange, whereby metallic contact with the latter is avoided in the final position of the parts. During assembly, however, the metallic lower end 17 of the depending flange serves effectually as a guide member for centering the parts as they are telescoped together and preventing the vertical insulating lining 16 from being torn off of the face of the flange 13. The insulation is completed by a sheet of insulating material 20 disposed between the abutting ends of the telescoping parts 11 and 1, and the parts are held together by bolts 21 which are insulated by a mica bushing 22 and a hard fibre insulating washer 23.

The other parts of the apparatus, as shown in the drawing, are standard parts. For the sake of completing the description it is mentioned that the shaft 9, is centered by means of upper and lower bearings 24 and 25 and is provided with an upper extension 26 serving as an exciter shaft carrying an exciter armature 27 which cooperates with an exciter stator 28 which is mounted on an exciter support 29. A platform 30 and steps 31 complete the framework of the machine. The pipes for supplying lubricating oil and cooling water to the upper bearings are provided with insulating pipe couplings 32 for preventing the grounding of the upper bracket 11.

While I have shown my invention in a preferred form and in its application to a single apparatus, it is to be understood that my invention is not so limited. I desire, therefore, that the appended claims shall be accorded the broadest interpretation consistent with the prior art.

I claim as my invention:

1. A dynamo-electric machine comprising a bearing bracket member, a stator frame member and means for insulatingly uniting said two members, said means comprising a flanged seat on one of said members for engaging the co-operating member, said flanged seat comprising a radially extending plane portion and an axially extending flange, said flange having a recess adjacent to the corner of said seat, insulating material in said recess, insulating material against said radially extending seat portion for insulating said co-operating member, said co-operating member having an enlarged head for laterally engaging the insulation in said recess but not engaging the non-recessed portion of said flange, and insulating clamping means for holding said two members together.

2. In a dynamo-electric machine, two co-operating members and means for insulatingly uniting said two members, said means comprising a flanged seat on one of said members for engaging the co-operating member, said flanged seat comprising a radially extending plane portion and an axially extending flange, said flange having a recess adjacent to the corner of said seat, insulating material in said recess, insulating material against said radially extending seat portion for insulating said co-operating member, said co-operating member having an enlarged head for laterally engaging the insulation in said recess but not engaging the non-recessed portion of said flange, and insulating clamping means for holding said two members together.

In testimony whereof, I have hereunto subscribed my name this 24th day of August, 1926.

CHARLES C. BRINTON.